(12) United States Patent
Okada

(10) Patent No.: US 6,317,614 B1
(45) Date of Patent: Nov. 13, 2001

(54) MOBILE COMMUNICATION TERMINAL

(75) Inventor: Yoshitaka Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,934

(22) Filed: Jun. 5, 1998

(30) Foreign Application Priority Data

Jun. 6, 1997 (JP) .................................................. 9-149227

(51) Int. Cl.[7] .................................................. H04M 1/00
(52) U.S. Cl. .......................................... 455/574; 455/566
(58) Field of Search .................................. 455/574, 566, 455/343, 38.3, 127, 571, 572, 573, 557; 379/413

(56) References Cited

U.S. PATENT DOCUMENTS

| | | | | |
|---|---|---|---|---|
| 5,586,182 | * | 12/1996 | Miyashita | 379/413 |
| 5,752,195 | * | 5/1998 | Tsuji et al. | 455/462 |
| 5,794,137 | * | 8/1998 | Harte | 455/343 |
| 5,881,377 | * | 3/1999 | Giel | 455/343 |
| 5,970,419 | * | 10/1999 | Terashima | 455/566 |
| 6,055,441 | * | 5/2000 | Wieand | 455/557 |

FOREIGN PATENT DOCUMENTS

| | | | | |
|---|---|---|---|---|
| 797310 A2 | * | 9/1997 | (EP) | 455/574 |
| 5-227263 | | 9/1993 | (JP) | |
| 7-170226 | | 7/1995 | (JP) | |
| 7-336417 | | 12/1995 | (JP) | |

\* cited by examiner

*Primary Examiner*—Daniel Hunter
*Assistant Examiner*—Nick Corsaro
(74) *Attorney, Agent, or Firm*—Sughrue, Mion, Zinn, Macpeak & Seas, PLLC

(57) ABSTRACT

A mobile communication terminal which stops the operation of a display portion when a user is unable to view the information displayed on the display portion in order to reduce unnecessary power consumption is provided. The mobile communication terminal contains a microphone, a microphone amplifier, a display, a display drive circuit, and a control circuit. The microphone receives a sound and outputs a corresponding input sound signal. The microphone amplifier inputs the input sound signal, amplifies the input sound signal to produce an amplified sound signal when set in an ON state, and does not produce the amplified sound signal when set in an OFF state. The display displays information, and the display drive circuit drives the display to display the information. The control circuit selectively sets the microphone amplifier in the ON state and the OFF state, instructs the display drive circuit not to drive the display when the microphone amplifier is set in the ON state, and controls the display drive circuit to drive the display when the microphone amplifier is set in the OFF state.

28 Claims, 1 Drawing Sheet

MOBILE COMMUNICATION TERMINAL

FIELD OF THE INVENTION

The present invention relates to a mobile communication terminal (e.g. a portable phone, a radio communication apparatus, or a mobile phone). More particularly, the invention relates to a control circuit which reduces the consumption of current by a hand-held mobile communication terminal.

BACKGROUND OF THE INVENTION

A typical example of a mobile communication terminal is a mobile phone. A mobile phone generally contains a display portion (e.g. a liquid crystal display (LCD)) to display information such as telephone numbers or an operational state of the phone so that a user can view such information. Also, in a conventional mobile phone, the display portion is driven by a display drive circuit which is operatively coupled to a power supply switch. When the power supply switch is turned ON to supply power to various components of the mobile phone, the display drive circuit continuously and constantly drives the display portion to display information. Also, the display drive circuit only stops driving the display portion when the power supply switch is turned OFF.

Usually, the mobile phone contains a microphone and a speaker which are provided on a handset housing. Also, the display portion is generally provided on the handset housing in an area between the microphone and the speaker. Therefore, when a user holds the mobile phone to the side of his or her face during a telephone conversation, the user cannot see the information that is displayed on the display portion. However, since the display portion is constantly driven by the display drive circuit when the mobile phone is turned ON, the display portion and display drive circuit unnecessarily consume a substantial amount of current.

In order to attempt to solve the problem above, a mobile telephone is disclosed in Japanese Patent Laid-open Publication No. Hei 7-170226. The mobile phone has an ear-piece portion which is located near the speaker of the mobile phone and a pressure sensor which is coupled to the ear-piece portion. When the ear-piece portion is brought into contact with a user's ear during a telephone conversation, the pressure sensor detects the pressure applied by the user's ear on the ear-piece portion and instructs the display drive circuit to stop driving the display portion. However, the pressure sensor is relatively expensive, and thus, incorporating such sensor into the mobile phone substantially increases the cost of the phone and makes the structure of the phone complicated. Also, in order for the pressure sensor to properly turn OFF the display, the ear-piece portion must remain in contact with the user's ear during the entire conversation. However, when the user's ear is slightly removed from the ear-piece portion (e.g. when the volume of the sound being received by the phone is high), the pressure sensor does not detect any pressure, and the display is not turned OFF. Therefore, the phone may still consume power unnecessarily.

SUMMARY OF THE INVENTION

An object of the present invention is to provide a mobile communication terminal which stops the operation of a display portion when a user can not view the information displayed on the display portion in order to reduce the unnecessary current consumption.

In order to achieve the above and other objects, a mobile communication terminal is provided. The mobile communication terminal comprises: a microphone which receives a sound and outputs a corresponding input sound signal; a microphone amplifier which inputs said input sound signal, which amplifies said input sound signal to produce an amplified sound signal when set in an ON state, and which does not produce said amplified sound signal when set in an OFF state; a display which displays information; a display drive circuit which drives said display to display said information; and a control circuit which is operably connected to said microphone amplifier and said display drive circuit, wherein said control circuit selectively sets said microphone amplifier in said ON state and said OFF state, wherein said control circuit instructs said display drive circuit not to drive said display when said microphone amplifier is set in said ON state, and wherein said control circuit controls said display drive circuit to drive said display when said microphone amplifier is set in said OFF state.

BRIEF DESCRIPTION OF THE DRAWING

The above objects and advantages of the present invention will become more apparent by describing in detail preferred embodiments thereof with reference to the attached drawing in which.

DETAILED DESCRIPTION OF THE PREFERRED EMBODIMENTS

Figure 1:
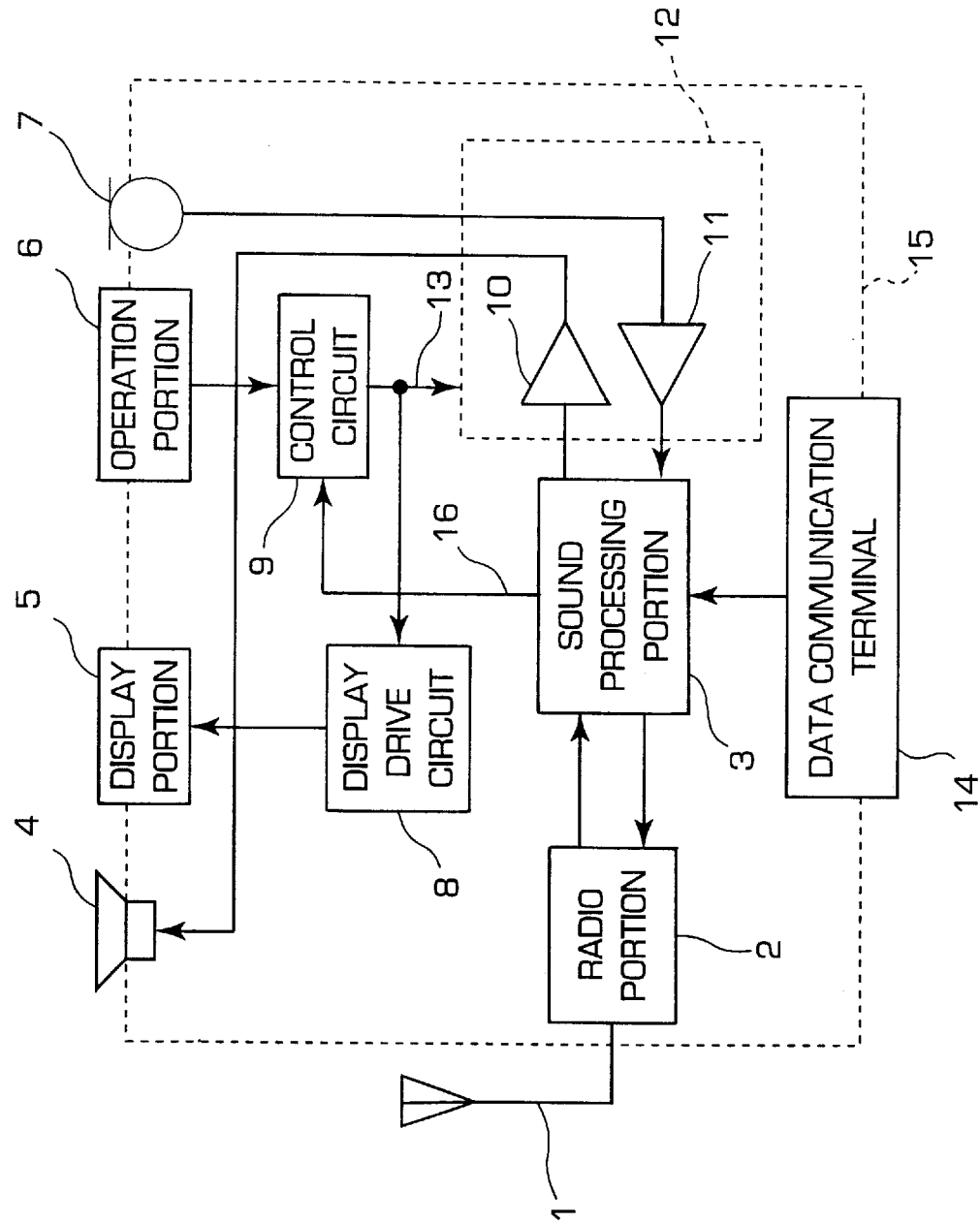
FIG. 1 shows the structure of a mobile communication terminal in accordance with an illustrative embodiment of the present invention.

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention which would have been known to one skilled in the art are omitted for the sake of clarity and brevity.

FIG. 1 shows the structure of a mobile communication terminal (e.g. a mobile phone) in accordance with an illustrative embodiment of the present invention. The mobile phone comprises an antenna 1, a radio portion 2, a sound processing portion 3, a speaker 4, a display portion 5, an operation portion 6, a microphone 7, a display drive circuit 8, a control circuit 9, an input/output ("I/O") portion 12, and a data communication terminal 14. Also, the phone comprises a terminal housing 15 for housing the components above.

The radio portion 2 receives input radio signals via the antenna 1 and formats them into formatted input signals. Then, the formatted input signals are output to the sound processing system 3 so that they can be appropriately processed. Also, the portion 2 receives processed output signals from the sound processing system 3 and converts them into output radio signals. Then, the output radio signals are output via the antenna 1.

The microphone 7 receives an input voice of a user and outputs a corresponding voice signal to the I/O portion 12. The I/O portion comprises a microphone amplifier 11 which amplifies the input voice signal and outputs the amplified voice signal to the sound processing portion 3 so that it can be processed. Then, the processing portion 3 outputs a corresponding processed output signal to the radio portion 2. The I/O portion 12 also contains a receiver amplifier 10 which receives an output sound from the processing portion 3. The output sound corresponds to a formatted input signal output to the sound processing portion 3 from the radio portion 2. The amplifier 10 amplifies the output sound, and supplies it to the speaker 4. The speaker 4 outputs the amplified output sound so that the user can hear it.

The display portion 5 (e.g. an LCD) displays various information regarding the operation of the mobile phone. For example, the display portion 5 may display telephone numbers or the operational status of the telephone so that the information can be viewed by a user.

The operation portion 6 acts as a user interface for the mobile phone so that the user can input various commands or data to the phone. The operation portion 6 may include the telephone dial buttons, operational mode buttons, command buttons, etc. Alternatively or additionally, the operation portion 6 may be a voice activated interface.

The control circuit 9 receives various commands and other information from the operation portion 6 and controls the various components of the mobile phone based on such information. (Please note that all of the connections between the control circuit 9 and some of the other components are not drawn in FIG. 1 for the sake of clarity).

The display drive circuit 8 receives various controls signals and other signals from the control circuit 9 and drives the display portion 5 to display information based on such signals. For example, a control signal may instruct the drive circuit 8 to display a telephone number currently being dialed.

The data communication terminal 14 is a communication port for connecting the mobile telephone to a modem of an external personal computer or to a facsimile machine. Thus, data can be input via the terminal 14, processed by the sound processing portion 3, and output via the radio portion 2 and the antenna 1.

During a telephone conversation, the control circuit 9 generates a control signal 13 to turn ON the microphone amplifier 11 (and the receiver amplifier 10) so that the voice signal of the user can be amplified. Then, the amplified voice signal is processed by the sound processing portion 3 and transmitted via the radio portion 2 and the antenna 1 to a remote user of another telephone. Also, the control signal 13 is output to the display drive circuit 8 to instruct the circuit 8 to turn OFF the display portion 5 when the microphone amplifier 11 is turned ON. Furthermore, the control signal 13 instructs the display drive circuit 8 to turn ON the display portion 5 when the microphone amplifier 11 is turned OFF.

Also, as shown in FIG. 1, the antenna 1 protrudes from the terminal housing 15, and the speaker 4, display portion 5, operation portion 6, microphone 7, and data communication terminal 14 are arranged at the surface of the terminal housing 15. In addition, the display portion 5 is located on the surface of the housing 15 between the speaker 4 and the microphone 7. On the other hand, the radio portion 2, sound processing portion 3, display drive circuit 8, control circuit 9, and I/O portion 12 are contained within the housing 15. Based on the above configuration of the mobile phone, the user cannot view the display portion 5 while he or she is having a telephone conversation. Therefore, if the display portion 5 is driven by the display drive circuit 8 during such time, power would unnecessarily consumed. Therefore, the control circuit 9 instructs the drive circuit 8 to turn OFF the display during such time.

Specifically, when a telephone conversation begins, the control circuit 9 turns ON the microphone amplifier 11 so that the input voice signal can be properly amplified and processed by the sound processing portion 3. Therefore, control signal 13 used to turn ON the amplifier 11 is used to instruct the display drive circuit 8 to turn OFF the display portion 5. As a result, power is not unnecessarily consumed by the mobile phone during a telephone conversation.

On the other hand, the display drive circuit 8 may continue to drive the display portion 5 when the power supply of the mobile terminal is turned ON and the microphone amplifier 11 is turned OFF. An example of a situation when the power of the phone is turned ON but the amplifier 11 is turned OFF is when the mobile phone is connected to a computer or a facsimile machine to transmit data via the antenna 1. In such a situation, viewing the information of the display portion 5 is important. For example, the user may need to see the telephone number which is or has been dialed so that he or she can confirm that the transmitted data is being transmitted to the proper location. Also, the display portion 5 may indicate the status of the transmission or reception of data and may indicate whether a connection has been established with the remote data transmitter or receiver. Furthermore, since the user does not hold the phone next to his or her face during a data transmission, the user is able to easily see the information displayed on the display. Also, when the user first turns ON the mobile phone and is not yet engaging in a telephone conversation, the user typically views the display portion 5 while he or she is dialing a telephone number to ensure that the number is being dialed correctly.

The control circuit 9 may determine when to turn ON the microphone amplifier 11 in a number of ways. In one embodiment, the control circuit 9 may turn ON the amplifier 11 after a user has dialed a telephone number and has pressed the "SEND" key on the operation portion 6 to place a call. Also, in such case, the control circuit 9 needs to differentiate between the situation in which the user is using the telephone to make a telephone call or to transmit or receive data via an external computer or facsimile. Accordingly, the control circuit 9 may be operatively connected to the data communication terminal 14 and detect if an external device is connected to the terminal 14 or if a signal is being input or output via the terminal 14. Thus, the circuit 9 may only turn ON the amplifier 11 when the "SEND" key is pressed and when an external device is not connected to the data communication terminal 14. Alternatively, instead of detecting if a computer or facsimile is connected to the terminal 14, the user may input a command to the control circuit 9 via the operation portion 6 to inform the circuit 9 that he is using the mobile phone for a data transmission. Also, the control circuit 9 may turn OFF the amplifier when an "END" key or disconnect key for ending a call is pressed.

In another embodiment, the control circuit 9 may be connected to the sound processing portion 3 by signal line 16 and detect when a communication link has actually been established between the mobile phone and another phone based on a signal output from the sound processing portion 3. "Actually established" means that the control circuit 9 detects the "SEND" key ("RECEIVE" key) being pressed at receiving a telephone or the control circuit 9 is detects the "SEND" key ("RECEIVE" key) of another phone, which receives telephone call from tihs phone, being pressed at calling a telephone. When a communication link has been established, the control circuit 9 may turn ON the microphone amplifier 11 and thus, indirectly turn OFF the display portion 5. Also the control circuit 9 may determine if the phone is being used for transmitting data to and/or from an external device in one of the manners described above.

In an additional embodiment, the control circuit 9 may be connected to the microphone 7 and detect whether or not the microphone 7 is outputting an input voice signal to the microphone amplifier 11. If a voice signal is detected, the control circuit 9 may turn ON the amplifier 11.

As described above, the present invention is capable of reducing the current and power consumption a mobile communication terminal. Thus, the size of the battery can be reduced, and the period between the times that the battery must be recharged can be extended. Also, by reducing the size of the battery, the overall size and weight of the mobile communication terminal can be reduced.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed:

1. A mobile communication terminal, comprising:
   a microphone which receives a sound and outputs a corresponding input sound signal;
   a microphone amplifier which inputs said input sound signal, which amplifies said input sound signal to produce an amplified sound signal when set in an ON state, and which does not produce said amplified sound signal when set in an OFF state;
   a display which displays information;
   a display drive circuit which drives said display to display said information; and
   a control circuit which is operably connected to said microphone amplifier and said display drive circuit,
   wherein said control circuit selectively sets said microphone amplifier in said ON state and said OFF state,
   wherein said control circuit instructs said display drive circuit not to drive said display whenever said microphone amplifier is set in said ON state, and
   wherein said control circuit controls said display drive circuit to drive said display when said microphone amplifier is set in said OFF state.

2. The mobile communication terminal as claimed in claim 1, further comprising:
   a speaker, which outputs an output sound signal; and
   a housing,
   wherein said microphone, said speaker, and said display portion are provided at a surface of said housing.

3. The mobile communication terminal as claimed in claim 1, further comprising:
   a data communication terminal which is adapted to be operatively connected to an external data communication device to enable said external data communication device to perform a data communication via said mobile communication terminal,
   wherein said control circuit controls said display drive circuit to drive said display when said external data communication device is performing said data communication.

4. The mobile terminal as claimed in claim 1, wherein said control circuit outputs a control signal to said microphone amplifier which selectively sets said microphone amplifier in said ON state and said OFF state,
   wherein said display drive circuit inputs said control signal and drives said display when said control signal sets said microphone amplifier in said OFF state and stops driving said display when said control signal sets said microphone amplifier in said ON state.

5. The mobile communication terminal as claimed in claim 1, further comprising:
   a user interface operatively connected to said control circuit,
   wherein a user can input alphanumeric data corresponding to a particular receiver via said user interface and can input a dial command via said user interface to instruct said mobile communication terminal to establish a voice communication link with said particular receiver, and
   wherein said control circuit turns ON said microphone amplifier when said dial command is input to establish said voice communication link.

6. The mobile communication terminal as claimed in claim 5, further comprising:
   a data communication terminal which is adapted to be operatively connected to an external data communication device to enable said external data communication device to perform a data communication via said mobile communication terminal,
   wherein said control circuit controls said display drive circuit to drive said display when said external data communication device is performing said data communication.

7. The mobile communication terminal as claimed in claim 6, wherein said control circuit is operably connected to said data communication terminal and detects if said external data communication device is connected to said data communication terminal, and
   wherein said control circuit controls said display drive circuit to drive said display when said external data communication device is connected to said data communication terminal.

8. The mobile communication terminal as claimed in claim 6, wherein said control circuit is operably connected to said data communication terminal and detects if said external data communication device is performing said data communication, and
   wherein said control circuit controls said display drive circuit to drive said display when external data communication device is performing said data communication.

9. The mobile communication terminal as claimed in claim 6, wherein said user can input a data transmission command via said user interface which informs said control circuit of said data communication,
   wherein said control circuit controls said display drive circuit to drive said display when data transmission command is input.

10. The mobile communication terminal as claimed in claim 1, further comprising:
    an antenna which receives an input communication signal; and
    a sound processor which inputs said input communication signal and processes said input communication signal to produce a communication link signal, wherein said communication link signal indicates whether or not a sound communication link is established with said mobile communication terminal, wherein said control circuit inputs said communication link signal, determines whether or not said sound communication link is established, sets said microphone amplifier in said ON state when said sound communication link is established, and sets said microphone amplifier in said OFF state when said sound communication link is not established.

11. The mobile communication terminal as claimed in claim 1, wherein said control circuit is operatively connected to said microphone and detects whether or not said microphone is inputting said input sound signal, and wherein said control circuit sets said microphone amplifier in said ON state when said input sound signal is input.

12. A mobile communication terminal, comprising:

a microphone which receives a sound and outputs a corresponding input sound signal;

a microphone amplifier which inputs said input sound signal, which amplifies said input sound signal to produce an amplified sound signal when set in an ON state, and which does not produce said amplified sound signal when set in an OFF state;

a display which displays information;

a display drive circuit which drives said display to display said information; and a control circuit which outputs a first control signal at least indirectly to said microphone amplifier, wherein said first control signal sets said microphone amplifier in said ON state when said first control signal has a first value and wherein said first control signal sets said microphone amplifier in said OFF state when said first control signal has a second value, wherein said display drive circuit at least indirectly inputs said first control signal, wherein said display drive circuit does not drive said display when said first control signal has said first value and drives said display when said first control signal has said second value.

13. The mobile communication terminal as claimed in claim 12, further comprising:

a speaker, which outputs an output sound signal; and a housing, wherein said microphone, said speaker, and said display portion are provided at a surface of said housing.

14. The mobile communication terminal as claimed in claim 12, further comprising:

a data communication terminal which is operatively connected to an external data communication device and which outputs a second control signal, wherein said second control signal has a first state which indicates that a data communication with said external data communication device exists, wherein said second control signal has a second state which indicates that said data communication with said external data communication device does not exist, wherein said second control signal causes said control circuit to output said first control signal having said first value when said second control signal has said second state and causes said control circuit to output said first control signal having said second value when said second control signal has said first state.

15. The mobile communication terminal as claimed in claim 12, further comprising:

a user interface operatively connected to said control circuit, wherein said user interface enables a user to input alphanumeric data corresponding to a particular receiver via said user interface and enables a user to input a dial command to instruct said mobile communication terminal to establish a voice communication link with said particular receiver, wherein said user interface outputs a second control signal that has a first mode which indicates that said voice communication link is established and has a second mode which indicates that said voice communication link is not established, wherein said second control signal causes said control circuit to output said first control signal having said first value when said second control signal has said first mode and causes said control circuit to output said first control signal having said second value when said second control signal has said second mode.

16. The mobile communication terminal as claimed in claim 15, further comprising:

a data communication terminal which is operatively connected to an external data communication device and which is operatively connected to said control circuit, wherein said data communication terminal outputs a third control signal that has a first state when said data communication with said external data communication device exists, wherein said third control signal has a second state when said data communication with said external data communication device does not exist, and wherein said third control signal causes said control circuit to output said first control signal having said first value when said third control signal has said second state and causes said control circuit to output said first control signal having said second value when said third control signal has said first state.

17. The mobile communication terminal as claimed in claim 16, wherein said data communication terminal outputs said third control signal having said first state to said control circuit to indicate that said external data communication device is connected to said data communication terminal, and wherein said data communication terminal outputs said third control signal having said second state to said control circuit to indicate that said external data communication device is not connected to said data communication terminal.

18. The mobile communication terminal as claimed in claim 16, wherein said data communication terminal outputs said third control signal having said first state to said control circuit in response to said user interface informing said control circuit of said data communication, and wherein data communication terminal outputs said third control signal having said second state to said control circuit when said user interface does not inform said control circuit of said data communication.

19. The mobile communication terminal as claimed in claim 12, further comprising:

an antenna which receives an input communication signal; and a sound processor which inputs said input communication signal and processes said input communication signal to produce a communication link signal, wherein said communication link signal has a first status which indicates that a sound communication link is established has a second status which indicates that a sound communication link is not established, wherein said communication link signal causes said control circuit to output said first control signal having said first value when said communication link signal has said first status and causes said control circuit to output said first control signal having said second value when said communication link signal has second status.

20. A mobile communication terminal comprising:

a microphone which receives a sound and outputs a corresponding input sound signal;

an input/output portion which receives said input sound signal and outputs an amplified output sound to a speaker;

a display which displays information;

a display drive circuit which drives said display to display said information; and a control circuit which outputs a control signal, wherein said control signal controls both said input/output portion and said display drive circuit, wherein said input/output portion includes a microphone amplifier which amplifies said input sound signal, wherein said control circuit outputs said control signal to activate said microphone amplifier during a telephone conversation and to instruct said display drive circuit not to drive said display when said microphone amplifier is activated.

21. The mobile communication terminal as claimed in claim 20, further comprising:

an operation portion which is connected to said control circuit, wherein said control circuit receives commands and information from said operation portion.

22. The mobile communication terminal as claimed in claim 21, wherein said operation portion comprises a plurality of buttons which includes at least telephone dial buttons, a "SEND" key to place a call, and an "END" key to terminate a call.

23. The mobile communication terminal as claimed in claim 20, further comprising:

a data communication terminal that connects to an external device, wherein, when said control circuit detects that said external device is connected to said data communication terminal, said control circuit instructs said display drive circuit to drive said display and deactivates said input/output portion.

24. A mobile communication terminal, comprising:

an information input portion which receives input information and outputs a first control signal in response to said input information, wherein said first control signal has a first value when said input information corresponds to first information and said first control signal has a second value when said input information corresponds to second information;

a control circuit that receives said first control signal and outputs corresponding a second control signal, wherein said second control signal has a first state when said first control signal has said first value and wherein said second control signal has a second state when said first control signal has said second value;

a microphone amplifier that receives said second control signal, wherein said microphone amplifier performs an amplification operation when said second control signal has said first state and does not perform said amplification operation when said second control signal has said second state; and a display drive circuit that receives said second control signal, wherein said display drive circuit does not drive a display when said second control signal has said first state and drives said display when said second control signal has said second state.

25. The mobile communication terminal as claimed in claim 24, wherein said first information indicates that a SEND key is activated on said information input portion and said second information indicates an END key is activated on said information input portion.

26. The mobile communication terminal as claimed in claim 24, wherein said second information corresponds to a command indicating a data transmission.

27. The mobile communication terminal as claimed in claim 24, wherein said first information indicates that an external data communication device is attached to said information input portion and said second information indicates that said external data communication device is not attached to said information input portion.

28. The mobile communication terminal as claimed in claim 20, wherein said control circuit outputs said control signal to deactivate said microphone amplifier when said telephone conversation does not occur and to instruct said display drive circuit to drive said display when said microphone amplifier is deactivated.

* * * * *